United States Patent [19]

Frazier

[11] 4,418,685
[45] Dec. 6, 1983

[54] ROOF-MOUNTED SOLAR COLLECTOR DEVICE

[76] Inventor: Wallace N. Frazier, 15919 Notting Hill Dr., Lutz, Fla. 33549

[21] Appl. No.: 281,471

[22] Filed: Jul. 8, 1981

[51] Int. Cl.³ .............................................. F24J 3/02
[52] U.S. Cl. ................................. 126/428; 126/427; 126/450; 126/447; 52/199
[58] Field of Search ............... 126/443, 429, 428, 427, 126/442, 450, 447; 52/199; 98/42 A

[56] References Cited

U.S. PATENT DOCUMENTS

| | | | |
|---|---|---|---|
| 2,214,183 | 9/1940 | Seymour | 52/199 |
| 2,529,621 | 11/1950 | Mayo | 126/428 |
| 2,579,662 | 9/1949 | Gibson | 98/42 A |
| 4,227,515 | 10/1980 | Jacob et al. | 126/427 |

FOREIGN PATENT DOCUMENTS

| | | | |
|---|---|---|---|
| 7612652 | 7/1977 | France | 126/429 |
| 2382650 | 11/1978 | France | 126/428 |

*Primary Examiner*—Samuel Scott
*Assistant Examiner*—Noah Kamen

*Attorney, Agent, or Firm*—Harrington A. Lackey

[57] ABSTRACT

A solar collector device adapted to be mounted upon the roof of a building in which a solar collector panel, including a chamber defined by a heat-conducting bottom wall, a coil for conveying heat-transfer fluid through the collecting chamber and in heat-conductive relationship with the bottom wall and a translucent upper cover, is mounted in spaced relationship above the roof to provide an air space between the collector panel and the roof through which hot air is transferred in heat-conducting relationship with the bottom wall. This collector device is particularly adapted for mounting above a roof having an attic-type space. A vent opening is formed through the roof communicating the attic-type space with the air space beneath the collector panel, whereby hot air from the attic-type space is conveyed in heat-transfer relationship with the bottom wall of the solar panel, so that the heat transfer medium in the coil receives heat, not only from the sun's rays, but also from the over-heated air within the attic space. The solar collector device is preferably shaped to straddle the ridge of a double-sloping roof.

5 Claims, 3 Drawing Figures

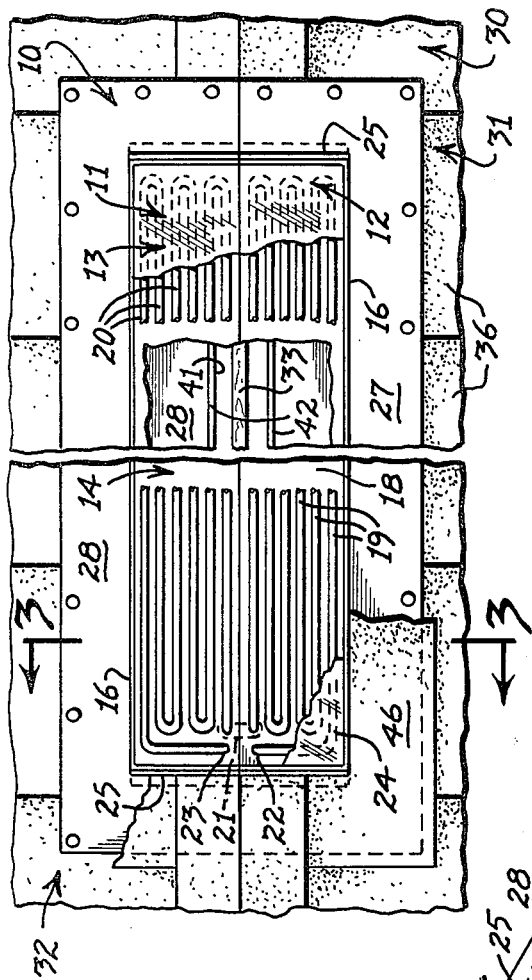
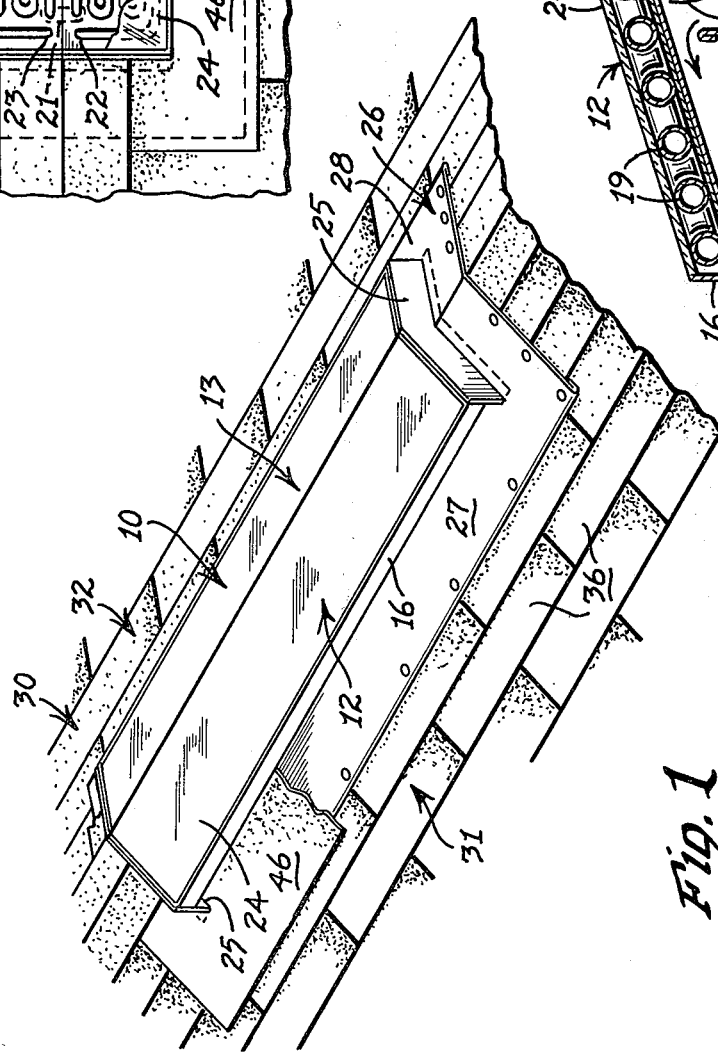
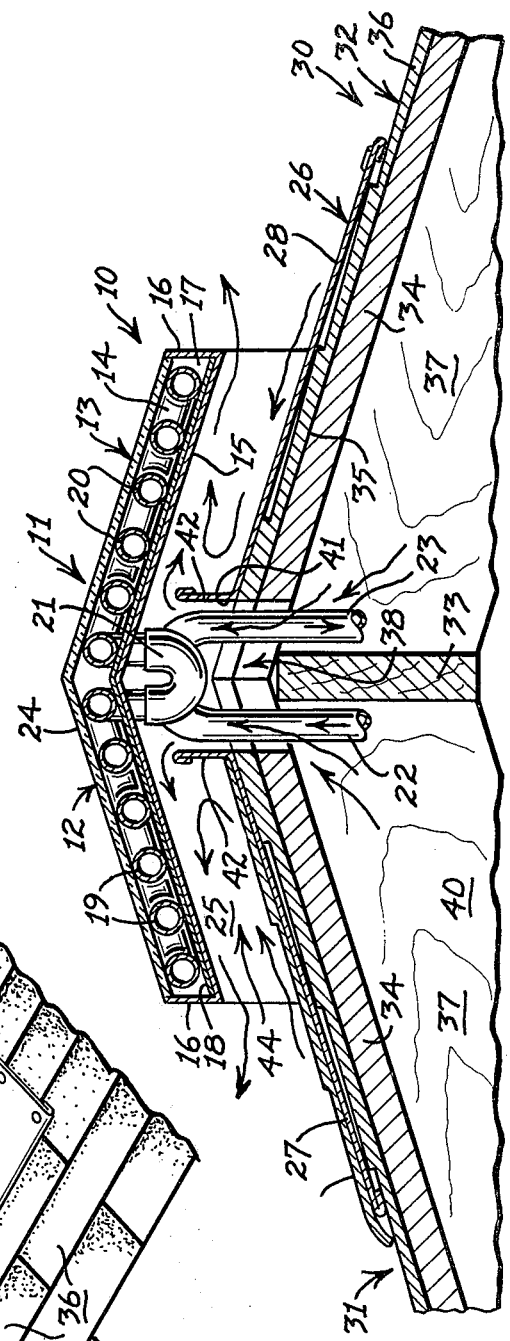

ROOF-MOUNTED SOLAR COLLECTOR DEVICE

BACKGROUND OF THE INVENTION

This invention relates to a solar heating device, and more particularly to a roof-mounted solar collector device.

Solar collector panels of various types are well known in the art for collecting solar rays in a chamber in heat-conductive relationship with a circulating heat-transfer medium which transfers the heat to a heater device or a heat storage receptacle, such as a water heating system, a space heating system, or a heated swimming pool. A typical solar collector panel includes a chamber having a bottom wall, usually having a black surface for maximum absorption of heat, in heat-conductive relationship with a conduit, such as a coil for conveying or transferring a heat transfer medium, such as water or other fluid in liquid or gaseous form. The heat collecting chamber is usually covered by a translucent cover member, such as glass or translucent plastic to permit free entry of the solar rays and to inhibit reflection of the rays from the solar collector panel.

The concept of mounting a solar collector device on the roof of a building for trapping and converting solar rays into heat energy and also for utilizing waste hot air in the attic, is disclosed in U.S. Pat. No. 4,227,515 of Robert I. Jacob et al. for "DUAL PHASE SOLAR WATER HEATER," issued Oct. 14, 1980. However, in the above Jacob et al. patent, two separate heat exchange systems are utilized in two different chambers isolated from each other by an insulated partition. The fluid-conveying coils in both heat exchangers may be isolated from each other, or placed in fluid communication with each other, by a set of thermostically-controlled valves.

Furthermore, although the Jacob device is designed to be mounted upon a roof in heat transfer relationship with the attic, nevertheless there is no teaching in Jacob of a solar collector device particularly constructed and adapted for straddling the ridge of a double-sloping roof.

SUMMARY OF THE INVENTION

It is therefore an object of this invention to provide a roof-mounted solar collector device which incorporates only a single heat exchanger for receiving heat from three different sources, namely the solar rays, the hot air from an over-heated roof, and the attic-type space beneath the roof.

In the preferred form of the invention, the solar collector device is especially constructed to fit over the ridge of a double-sloping roof so that the solar collector panels may receive solar rays from two different directions at various times of the day, or seasons of the year, and is also adapted to receive hot air from an attic-type space at its highest, and therefore its hottest, elevation.

The roof mounted solar collector device of this invention is designed for aesthetic appearances, having a low profile and being symmetrically balanced on opposite sides of the roof ridge. In its preferred form, there is no blower or fan employed so that the device is completely passive. The device is easily installed on either a new roof construction, or on an existing roof, with little danger of weather penetration through the roof.

Specifically, the solar collector device has a solar panel formed in two sections sloping downward from the intersecting center line, and having the general contour of the roof upon which the device is mounted. A single undulating heat transfer coil is formed in the chamber constituting both roof panel sections and is provided with an inlet for introducing a heat transfer fluid to the panel, and an outlet for extracting hot heat transfer fluid from the roof panel. A pair of end members support the roof panel upon a similarly roof-shaped bottom plate fitted snugly straddling the roof ridge, and preferably of heat-conductive material for further extracting heat from the roof material. The end members support the solar panel above the heat-conducting plate to form an open air space. Air heated by the roofing material may pass through the air space in thermal conductive relationship with the bottom wall of the solar panel which is also heat-conductive. A portion of the conductive bearing plate straddling the ridge of the roof has a vent port therethrough in registry with a vent opening along the ridge of the roof so that the hot air within the attic-type space is in fluid communication with the air space beneath the collector panel.

In the preferred form of the invention, the vent port extends along the ridge and is provided with a pair of upstanding walls to prevent rain and other weather elements which might blow beneath the solar panel from passing down into the attic through the vent opening.

The bottom bearing plate of the device also functions as a flashing for carrying water away from the ridge of the roof and down the opposite sloping sides of the roof.

BRIEF DESCRIPTION OF THE DRAWINGS

FIG. 1 is a top perspective view of the solar collector device made in accordance with this invention, and mounted upon the ridge of a double-sloping roof;

FIG. 2 is a top plan view of the collector device disclosed in FIG. 1, with portions broken away; and FIG. 3 is a greatly enlarged fragmentary section taken along the line 3—3 of FIG. 2.

DESCRIPTION OF THE PREFERRED EMBODIMENTS

Referring now to the drawings in more detail, the solar collector device 10 made in accordance with this invention includes an inverted V-shaped solar collector panel 11, including a pair of panel sections 12 and 13 forming a continuous collector chamber 14. The chamber 14 is defined by a substantially rectangular, inverted V-shaped bottom wall 15, which is preferably of metal or other thermally-conductive material and side walls 16 and end walls 17. The top surface of the bottom wall 15 may be clad with a thin conductive back plate 18, preferably colored or painted black to absorb the maximum amount of heat received within the chamber 14.

Extending the length of and within each collector panel section 12, in a zig-zag or undulating fashion is a continuous heat-transfer coil or pipe 19. In like manner a continuous, undulating heat transfer coil 20 extends through panel section 13. These pipe sections 19 and 20 are connected in series by the U-shaped joint or coupling 21. An inlet conduit 22 is connected to one end of the coil 19, while the discharge or outlet conduit 23 is connected to the opposite end of the coil 20.

The top of the collector chamber 14 is closed by a translucent cover member 24, having the same inverted V-shape as the collector panel 11.

The translucent cover panel 24 is preferably translucent "Plexiglass," although other types of translucent material, such as glass, might be used.

The opposite end walls 17 of the panel 11 are fixed to corresponding end members 25 which depend below the bottom wall 15 and are rigidly secured or fixed to a thermally-conductive bearing plate member 26. The plate member 26 is generally rectangular and of greater length and width than the solar panel 11, and also includes a pair of sloping plate sections 27 and 28 which intersect along the longitudinal center of the plate 26 and at the same angle as the panel sections 12 and 13 join each other in the inverted V-shaped solar collector panel 11.

The bearing plate member 26 is adapted to straddle the ridge of the particular sloping roof 30 upon which the device 10 is adapted to be mounted, and to seat in snug engagement on the top surfaces of the oppositely sloping roof sides 31 and 32. In other words, the dihedral angle formed by the intersecting plate sections 27 and 28 is substantially equal to the dihedral angle of the intersecting roof sides 31 and 32. The roof 30 as disclosed in FIG. 3 includes a ridge rafter or board 33 supporting a plurality of laterally declining rafters 37 supporting the roof sheathing 34 carrying the roof paper 35 and the overlapping shingles 36 in a conventional manner.

A vent opening 38 is cut through the apex or ridge of the roof 30 to permit the upward discharge of hot air from the attic-type space 40 beneath the roof 30. Registering with the vent opening 38 is an elongated air inlet port 41 formed in the angular portion of the bearing plate member 26. The longitudinal and opposed edge portions of the air inlet port 41 project upward forming a continuation of the metal plate sections 27 and 28 to form parallel vertical walls 42 which terminate below the bottom wall 15 of the roof panel 11.

The air chamber or space 44 between the bottom wall 15 and the portion of the plate sections 27 and 28 beneath the bottom wall 15 forms a passageway for the hot air discharging from the attic space 40 through the vent opening 38 and the inlet port 41. The discharging hot air can flow laterally in either or both directions beneath, and in heat-transfer relationship with, the conductive bottom wall 15 to transfer heat from the hot air discharging from the attic through the conductive bottom wall 15 and backing plate 18 to the heat transfer tubes 19 and 20. The fluid carried by the tubes 19 and 20 absorbs this conducted heat energy and conveys it through the outlet conduit 23 to a desired heating device, such as a water heater, or a space heater, not shown.

If the device 10 is designed to provide heat for a water heater, then cold water is introduced from any desired source through the inlet conduit 22 to the tubular coil 19. As the water circulates through the conduit 19 and then serially through the conduit 20 to the outlet conduit 23, heat is absorbed from solar rays transmitted through the translucent cover member 24, from the hot air in the attic space 40 through convection in the air chamber 44 and subsequently by conduction through the bottom wall 15 and backing plate 18 to the tubular coils 19 and 20.

Heat is also received within the coils 19 and 20 by conduction through the bottom wall 15, end walls 17 and the end members 25, which are also preferably metal or other heat-conductive material engaging the heat-conductive bearing plate 26. Thus, the heat developed in the roofing material, and particularly in the shingles 36, is transferred by conduction through the contiguous bearing plate member 26, where the heat is conducted through conductive end members 25 to the walls of the collector chamber 14.

It is also possible for the device 10 to be modified in such a manner that the solar panel 11 and bearing plate member 26 is each perfectly planar, but still spaced to provide the air passage 44. Then the plate member 26 may be mounted flush against any portion of a sloping or flat roof for absorption of heat from the conventional roofing material, which can be transferred to air moving through the air space 44, which in turn is in heat-transfer relationship with the bottom wall 15. Moreover, heat may be transferred by conduction of the roofing material through the bearing plate member 26, through the end walls 25, to the walls of the chamber 13, as previously described.

It is also possible to have such a modified planar solar panel 11 and bearing plate member 26 placed flush upon a sloping section of the roof and to bore a hole through the roof at that point for discharge of the hot air from the attic space 40 through the air chamber 44. Such a device would not tap the attic hot air at its highest and hottest elevation, but would nevertheless receive substantial volumes of hot air for transfer to the conductive bottom wall 15 for transferring heat to the coils 19 and 20.

The upstanding parallel walls 42 are primarily to prevent weather elements, such as blowing rain, from passing through the air space 44 and back down through the vent opening 38 into the attic space 40. The vertical walls 42, which do not extend to the full height of the air space 44, also provide a Venturi effect for any ambient atmospheric air which might blow through the air space 44 to create a suction upon the rising hot air passing through the vent opening 38 and the inlet port 41. Such induced suction expedites the removal of hot air in greater volumes from the attic to the exterior of the collector device 10 at increased velocities.

The side openings in the air chamber 44 extend the full length of both sides of the collector panel 11.

Moreover, in the preferred form of the invention, the vent opening 38 and air inlet port 41 extend the full length of the solar panel 11.

It is also within the scope of this invention to mount more than one collector device 10 upon the ridge or ridges of the roof of a building in order to maximize the heat transfer potential of the devices 11. If numerous collector devices 10 are utilized, then the symmetry of the design of the devices 10 will balance the weight of the devices 10 substantially equally on opposite sides of the roof ridge so that the various roof sections 31 and 32 can evenly bear the weight of the various collector devices 10.

Moreover, in the preferred form of the invention, no exhaust fan is utilized in expelling the hot air from the attic space 40 through the vent opening 38 to the hot air chamber 44. It is believed that the natural convectional force of the hot air as well as ambient air movement across the roof top is sufficient to create the necessary draft for expelling the hot air from the attic space 40 as well as to bring this hot air into heat transfer relationship with the conductive bottom wall 15 of the solar panel 11.

Thus, a solar collector device 10 made in accordance with this invention can eliminate the utilization of conventional attic roof fans for expelling hot air from the attic spaces in order to minimize the heating load upon the conventional air conditioning systems.

The bearing plate member 26 which is substantially longer and wider than the solar panel 11 provides a flashing for the collector device 10 so that water runs off of the device 10, including the bearing plate member 26 without penetrating the existing roofing.

For aesthetic appearance, additional roofing, such as the shingles 46, may be mounted over the bearing plate sections 27 and 28 to conceal the bearing plate sections 27 and 28 from view, so that only the solar panel 11 is visible. However, because of the low profile of the solar collector 11 and the fact that it lies symmetrically along the roof ridge, the collector device 10 is not readily noticeable and does not present an objectionable appearance.

Because of the simplicity in construction of the device, because of the single system of heat exchanger coils, and the absence of blowers and fans, the device is relatively inexpensive to manufacture, assemble, purchase, and install.

The collector device 10 could be utilized as a heat source for a space heater where the heating demands are not too great, or where there is sufficient solar radiation and sufficient numbers and/or sizes of collector devices 10 to accommodate the particular heating load requirements. In this event, the fluid inlet conduit 22 and the fluid outlet conduit 23 would be connected in a closed system with the space heater device for continuous recirculation of the particular heat transfer fluid or refrigerant.

The collector device 10 could, of course, be utilized to heat a swimming pool, and could be utilized as one of the coils or heat exchangers in a heat pump.

Preferably, the collector device 10 is mounted along a roof ridge which extends generally in a north-south direction so that as the sun moves across the roof from east to west, one panel section, such as the panel section 12, if located on the east side of the house, would receive most of the solar radiation of the morning, while the other panel section 13 would receive maximum radiation from the afternoon sun.

What is claimed is:

1. A passive solar collector device adapted to be mounted in operative position on the roof of a building having an interior air space beneath the roof and a vent opening through the roof in fluid communication with the interior air space,
   (a) a solar collector panel comprising an elongated solar collecting chamber having opposite end portions and opposite side portions and an uninsulated thermal-conductive bottom wall of pre-determined substantial area,
   (b) means for conducting a heat transfer fluid through said collecting chamber in heat-transfer relationship with said bottom wall, including a fluid inlet and a fluid outlet,
   (c) an uninsulated thermal-conductive bearing plate beneath, and at least co-extensive with, said bottom wall, said bearing plate being adapted to seat flush against, and in thermal-conductive relationship with, a portion of a roof upon which the solar collector device is mounted in operative position,
   (d) thermally conductive end members spaced apart longitudinally of and fixed to said bearing plate, and in thermal-conductive relationship between said bottom wall and said bearing plate, said end members supporting said solar collector panel in spaced relationship above said bearing plate and said bottom wall,
   (e) an air inlet port extending through said bearing plate and adapted to register with the vent opening through the roof, when the solar collector device is mounted in its operative position upon the roof, said air inlet port being in fluid communication between said air space and the interior air space beneath the roof,
   (f) opposed side openings between the respective side portions of said bottom wall and said bearing plate and between said end members in open fluid communication with said air space to permit the free passage of ambient air transversely through said air space and across said air inlet port, so that air in said air space is in heat transfer relationship with said bottom wall, said bearing plate and said end members, and is in fluid communication with the atmospheric air outside said solar collector panel and the interior air space beneath the roof, when the solar collector device is in said operative position.

2. The invention according to claim 1 in which said end members comprise end wall members fixed to said opposite end portions of said solar collector panel, and said opposed side openings and said air space being completely open between said end wall members and between said bottom wall and said bearing plate.

3. The invention according to claim 1 in which the roof upon which the collector device is adapted to be mounted includes two sloping sides intersecting in a ridge, the vent opening extending through the ridge of the roof, said solar panel comprising first and second sloping panel sections intersecting along its longitudinal center line and being generally shaped to fit longitudinally of, and to straddle, the ridge of the roof, said first and second panel sections lying on opposite sides of the ridge in operative position, said bearing plate including first and second plate sections shaped to fit flush against the corresponding sides of the roof on opposite sides of the ridge.

4. The invention according to claim 1 in which said fluid inlet and said fluid outlet extend through the vent opening into the interior air space, when the solar collector device is in its operative position.

5. The invention according to claim 1 in which the surface area of said bearing plate engaging the roof is greater than the top surface area of said solar collector panel.

* * * * *